(12) United States Patent
Yamamoto

(10) Patent No.: US 8,858,050 B2
(45) Date of Patent: Oct. 14, 2014

(54) VEHICULAR LAMP WITH PLURALITY OF LIGHT SOURCE AND COMPLEX LENS

(75) Inventor: Ippei Yamamoto, Shizuoka (JP)

(73) Assignee: Koito Manufacturing Co., Ltd. (JP)

( * ) Notice: Subject to any disclaimer, the term of this patent is extended or adjusted under 35 U.S.C. 154(b) by 281 days.

(21) Appl. No.: 13/441,167

(22) Filed: Apr. 6, 2012

(65) Prior Publication Data

US 2012/0262935 A1    Oct. 18, 2012

(30) Foreign Application Priority Data

Apr. 15, 2011 (JP) ................. 2011-090992

(51) Int. Cl.
*B60Q 1/26* (2006.01)
*B60Q 1/14* (2006.01)
*F21S 8/10* (2006.01)

(52) U.S. Cl.
CPC ............... *B60Q 1/14* (2013.01); *F21S 48/1258* (2013.01)
USPC ............ 362/544; 362/507; 362/517; 362/538

(58) Field of Classification Search
CPC ...... B60Q 1/0029; B60Q 1/0041; B60Q 1/16; B60Q 1/18; B60Q 1/04; F21S 10/00; F21V 13/10; F21V 5/045; F21V 5/08; F21Y 2101/02
USPC ......... 362/543, 544, 545, 507, 517, 538, 236, 362/240, 241, 249.02, 249.06, 249.14
See application file for complete search history.

(56) References Cited

U.S. PATENT DOCUMENTS

| | | | | |
|---|---|---|---|---|
| 1,416,467 A * | 5/1922 | Hobbs | ........................... | 362/487 |
| 3,743,385 A * | 7/1973 | Schaefer | ........................ | 359/718 |
| 7,311,430 B2 * | 12/2007 | Tsukamoto et al. | .......... | 362/545 |
| 7,387,416 B2 * | 6/2008 | Tsukamoto et al. | .......... | 362/518 |
| 7,607,811 B2 * | 10/2009 | Okada | ........................... | 362/545 |
| 7,654,714 B2 * | 2/2010 | Mochizuki et al. | ........... | 362/539 |
| 8,038,334 B2 * | 10/2011 | Ishida | ............................ | 362/539 |
| 8,201,980 B2 * | 6/2012 | Ookubo et al. | ................ | 362/517 |
| 8,246,225 B2 * | 8/2012 | Chang | ........................... | 362/475 |
| 8,469,565 B2 * | 6/2013 | Yatsuda | ........................ | 362/522 |
| 2009/0154185 A1 * | 6/2009 | Yagi | ................................ | 362/516 |
| 2011/0051413 A1 * | 3/2011 | Hand | ............................. | 362/235 |

FOREIGN PATENT DOCUMENTS

JP    2006-164735    6/2006

* cited by examiner

*Primary Examiner* — Ismael Negron
(74) *Attorney, Agent, or Firm* — Cantor Colburn LLP

(57) ABSTRACT

A vehicular lamp having first and second light source units disposed behind a projection lens is provided. In the second light source unit, light from a second light source disposed at a position lying further downward than the position of an optical axis of the projection lens is reflected toward the projection lens by a reflection surface of a second reflector disposed to extend downward from a front end edge of a shade. In this case, an upper area of the projection lens is configured such that light from a rear focus of the upper area of the projection lens is emitted further downward than emission light from a general area other than the upper area.

2 Claims, 6 Drawing Sheets

VEHICULAR LAMP WITH PLURALITY OF LIGHT SOURCE AND COMPLEX LENS

CROSS-REFERENCE TO RELATED APPLICATIONS

This application is based on and claims priority from Japanese Patent Application No. 2011-090992, filed on Apr. 15, 2011, with the Japanese Patent Office, the disclosure of which is incorporated herein in its entirety by reference.

TECHNICAL FIELD

The present disclosure relates to a projector type vehicular lamp in which first and second light source units are disposed in the rear of a projection lens.

BACKGROUND

In the related art, there has been known a projector type vehicular lamp in which a light source unit is disposed in the rear of a projection lens.

Japanese Patent Application Laid-Open No. 2006-164735 discloses a configuration of the vehicular lamp that includes a first light source unit which is turned ON when a low-beam light distribution pattern is formed, and a second light source unit which is additionally turned ON when a high-beam light distribution pattern is formed.

In the vehicular lamp disclosed in Japanese Patent Application Laid-Open No. 2006-164735, the first light source unit includes a first light source disposed at a position lying further the rearward than a rear focus of the projection lens, a first reflector disposed to cover the first light source from above and adapted to reflect light from the first light source toward the projection lens, and a shade disposed to allow a front end edge to pass through the rear focus and adapted to shield some portion of reflected light from the first reflector. The second light source unit includes a second light source disposed at a position lying further downward than the rear focus and a second reflector disposed to extend downward from a front end edge of the shade and adapted to reflect light from the second light source toward the projection lens.

SUMMARY

In the vehicular lamp disclosed in Japanese Patent Application Laid-Open No. 2006-164735, an additional light distribution pattern is formed in the upper side of the low-beam light distribution pattern by additionally turning ON the second light source unit, and as a result, the high-beam light distribution pattern is formed. However, light that is incident on the projection lens from the first light source unit passes through a portion which lies further upward than the front end edge of the shade, whereas light that is incident on the projection lens from the second light source unit passes through a position which lies further downward than the front end edge of the shade. As a result, the additional light distribution pattern is formed at a portion which lies further upward than a cut-off line thereof without being overlapped with the low-beam light distribution pattern.

Therefore, brightness in a boundary portion between the low-beam light distribution pattern and the additional light distribution pattern cannot be sufficiently ensured in the high-beam light distribution pattern.

When a new reflector that reflects the light from the second light source toward the front side is disposed below the second light source unit, and the reflected light from the reflector is irradiated to the front side of the lamp by passing through a portion below the projection lens without causing the reflected light to be incident on the projection lens, a new light distribution pattern can be formed across the low-beam light distribution pattern and the additional light distribution pattern. However, in this case, since the vehicular lamp becomes a composite lamp of a projector type and a parabolic type, the degree of freedom for a design or layout of the lamp is reduced.

The present disclosure has been made in an effort to provide a vehicular lamp in which first and second light source units are disposed in the rear of a projection lens, which is capable of sufficiently ensuring brightness of a boundary portion between a low-beam light distribution pattern and an additional light distribution pattern in a high-beam light distribution pattern.

The present disclosure is devised to achieve the object by adopting a newly-designed projection lens configuration.

An exemplary embodiment of the present disclosure provides a vehicular lamp which includes a projection lens, a first light source unit disposed in the rear of the projection lens and adapted to form a low-beam light distribution pattern when it is turned ON, and second light source units disposed in the rear of the projection lens and adapted to form a low-beam light distribution pattern when it is additionally turned ON. The first light source unit includes a first light source disposed at a position lying further rearward than a rear focus of the projection lens, a first reflector disposed to cover the first light source from above and adapted to reflect light from the first light source toward the projection lens, and a shade disposed to allow a front end edge to pass through the rear focus or the vicinity thereof and adapted to shield some portion of reflected light from the first reflector. The second light source unit includes a second light source disposed at a position lying further downward than the rear focus and a second reflector disposed to extend downward from a front end edge of the shade or the vicinity thereof and adapted to reflect light from the second light source toward the projection lens. The upper area of the projection lens emits the light from the rear focus further downward than light emitted from a general area other than the upper area.

The type of the first light source is not particularly limited. Further, the specific position or direction of the first light source is not particularly limited as long as it is disposed at a position lying further rearward than the rear focus of the projection lens.

The specific shape of the shade is not particularly limited as long as it is configured to shield some portion of reflected light from the first reflector in a state that a front end edge thereof is disposed to pass through the rear focus or the vicinity thereof.

The type of the second light source is not particularly limited. Further, the second light source may be disposed just below the rear focus and otherwise may be disposed to be displaced in a forward-rearward direction or leftward-rightward direction from just below the rear focus as long as it is disposed to be displaced at a position which lies further downward than the rear focus and furthermore, the direction of displacement is not particularly limited.

The specific shape or direction of the reflection surface of the second reflector is not particularly limited as long as it is configured to reflect the light from the second light source toward the projection lens in a state that it is disposed to extend downward from the front end edge or the vicinity of the shade.

The specific lens shape of the projection lens is not particularly limited as long as the upper area of the projection lens is configured to emit the light from the rear focus further downward than the light emitted from the general area, and further, a specific position of a boundary line between the upper area and the general area is not particularly limited. Further, the general area and the upper area of the projection lens may be configured as a single member, and the general area and the upper area formed by separate members may be fixed or positioned by bonding.

According to an exemplary embodiment of the present disclosure, a vehicular lamp includes a first light source unit which is turned ON to form a low-beam light distribution pattern and a second light source unit which is additionally turned ON to form a high-beam light distribution pattern, which are disposed in the rear of a projection lens. However, since the upper area of the projection lens is configured to emit light from a rear focus further downward than emitted light from a general area, the following operational effects can be obtained.

That is, a first light source unit is configured such that light from the first light source disposed at a position which lies further rearward than the rear focus of the projection lens is reflected toward the projection lens by a first reflector disposed to cover the first light source from above and some portion of the reflected light from the first reflector is shielded by a shade disposed to allow a front end edge to pass through the rear focus or the vicinity thereof As a result, the low-beam light distribution pattern having cut-off lines on the upper end portion thereof is formed by turning ON the first light source unit. In this case, all or most of the light reflected from the first reflector and is incident on the projection lens is incident on a general area of the projection lens, and as a result, the low-beam light distribution pattern is formed to have substantially the same shape as in the related art.

Meanwhile, a second light source unit is configured such that light from the second light source disposed at a position which lies further downward than the rear focus is reflected toward the projection lens by a second reflector disposed to extend downward from the front end edge of the shade or the vicinity thereof As a result, an additional light distribution pattern is formed in the upper side of cut-off lines of the low-beam light distribution pattern by turning ON the second light source unit. In this case, the lower area of the additional light distribution pattern is formed by some portion of light incident on the upper area of the projection lens among the reflected light from the second reflector. However, the light incident on the upper area of the projection lens is emitted further downward as compared to light that is emitted by the general projection lens. As a result, the additional light distribution pattern is formed to be a light distribution pattern that is expanded further downward than the cut-off lines of the low-beam light distribution pattern.

Therefore, the high-beam light distribution pattern is formed to be a light distribution pattern in which the low-beam light distribution pattern and the additional light distribution pattern are overlapped with each other in the vicinity of the cut-off lines in the low-beam light distribution pattern. Accordingly, the brightness of a boundary portion therebetween can be sufficiently ensured.

According to the vehicular lamp of the present disclosure that includes the first and second light source units disposed in the rear of the projection lens, the brightness of a boundary portion between a low-beam light distribution pattern and an additional light distribution pattern in a high-beam light distribution pattern can be sufficiently ensured. Accordingly, distant visibility in a high beam can be improved. This can be implemented within a range of a projector type lamp configuration.

In the above configuration, when the shade is configured to have an upwardly oriented reflection surface that extends rearward from the front end edge thereof and a boundary line between the upper area and the general area in the projection lens is configured to be positioned at a position which lies further upward than the rear focus (that is, the rear focus of the general area), the following operational effects can be acquired.

That is, when the shade has the upwardly oriented reflection surface that extends rearward from the front end edge thereof, the reflected light from the first reflector which should be shielded by the shade can be reflected upward on the upwardly oriented reflection surface to be incident on the projection lens. By this configuration, the light from the first light source can be effectively used, so that brightness in an area in the vicinity of the cut-off lines in the low-beam light distribution pattern can be increased.

However, in such a configuration, the reflected light from the first reflector, which is reflected on the upwardly oriented reflection surface, is incident on the projection lens at a position which lies further upward than the rear focus. Therefore, when the boundary line between the upper area and the general area in the projection lens is set to be positioned at a position which lies further upward than the rear focus, the reflected light from the first reflector, which is reflected on the upwardly oriented reflection surface, can be prevented from being incident on the upper area of the projection lens or suppressed to be minimally incident on the upper area of the projection lens. As a result, the reflected light from the first reflector that is reflected on the upwardly oriented reflection surface and emitted from the projection lens can be kept at a state where the reflected light is utilized to increase brightness in the area in the vicinity of the cut-off lines in the low-beam light distribution pattern.

In the above configuration, the specific lens shape of the upper area of the projection lens is not particularly limited as described above, but when the upper area is configured to have a rear focus at a position which lies further downward than the rear focus, the shape of the projection lens can be easily designed.

In the above configuration, when the second light source unit is configured to have a third reflector that reflects the light from the second light source toward the second reflector, the degree of freedom of arrangement for the second light source can be improved and further, the reflected light from the second reflector can be efficiently incident on the upper area of the projection lens.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 3 is a side cross-sectional view illustrating the vehicular lamp by considering a light path when a first light source unit is turned ON.

FIG. 4 is a side cross-sectional view illustrating the vehicular lamp by considering a light path when a second light source unit is turned ON.

DETAILED DESCRIPTION

In the following detailed description, reference is made to the accompanying drawing, which form a part hereof The illustrative embodiments described in the detailed description, drawing, and claims are not meant to be limiting. Other embodiments may be utilized, and other changes may be made, without departing from the spirit or scope of the subject matter presented here.

Hereinafter, an exemplary embodiment of the present disclosure will be described with reference to the accompanying drawings.

Figure 1:
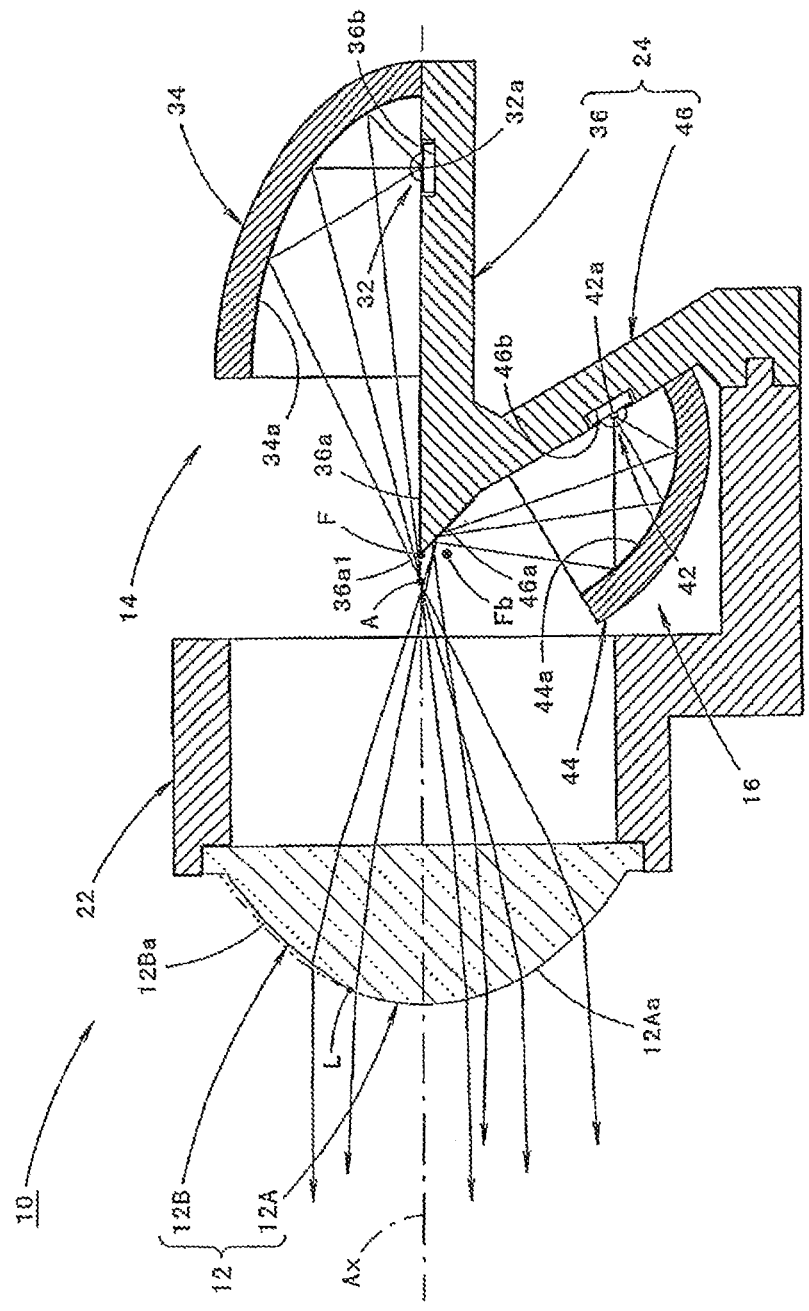
FIG. 1 is a side cross-sectional view illustrating a vehicular lamp according to an exemplary embodiment of the present disclosure.
Figure 2:
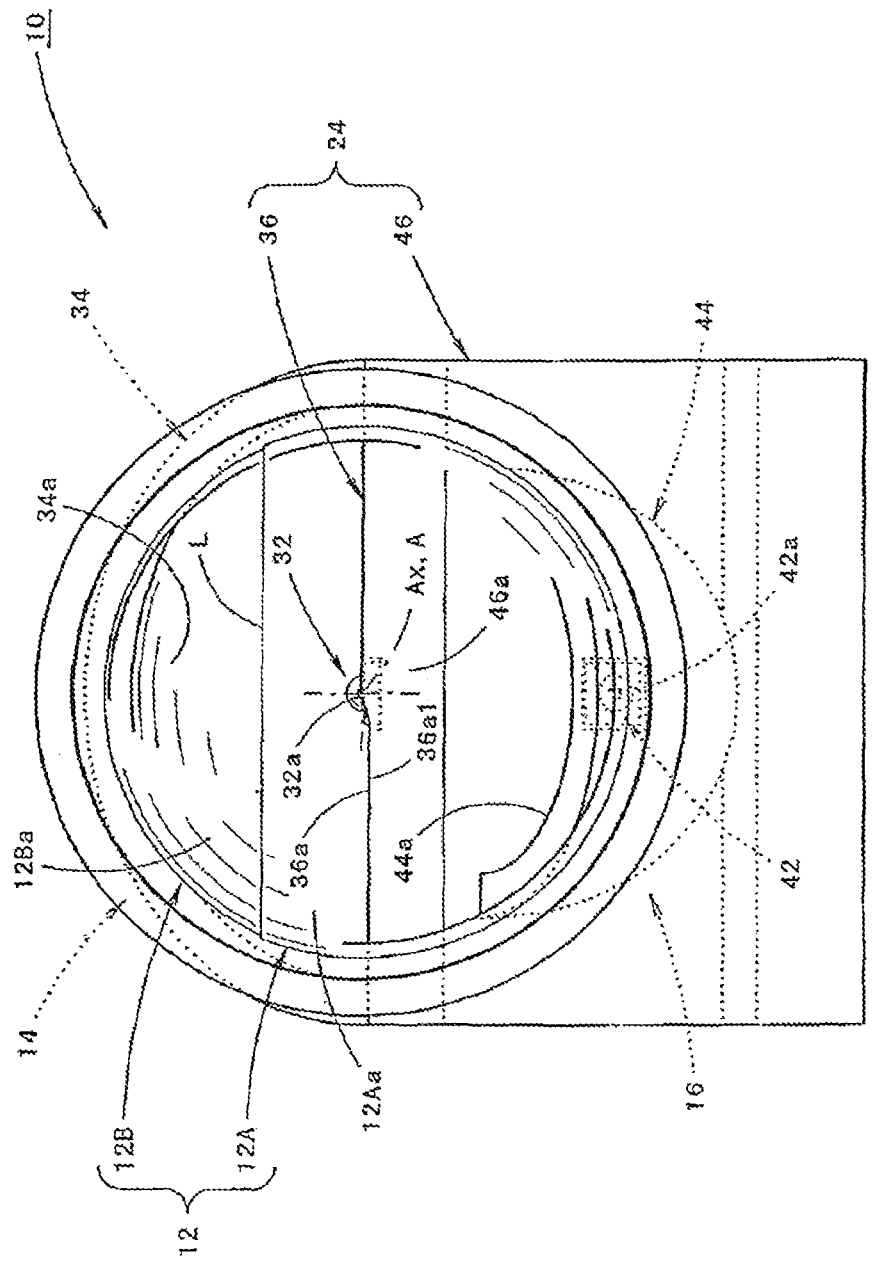
FIG. 2 is a front view illustrating the vehicular lamp.

FIGS. 1 and 2 are a side cross-sectional view and a front view, respectively, that illustrate a vehicular lamp 10 according to an exemplary embodiment of the present disclosure.

As shown in the figures, vehicular lamp 10 includes a projection lens 12, and first and second light source units 14, 16 disposed in the rear of projection lens 12.

Vehicular lamp 10 serves as a lamp unit that is used as a part of a headlamp to be assembled. When being assembled to the headlamp, vehicular lamp 10 is disposed in a state that an optical axis Ax of projection lens 12 extends in a downward direction at an angle of about 0.5° to 0.6° with respect to forward-rearward direction of a vehicle.

Projection lens 12 is held by a lens holder 22, and first and second light source units 14, 16 are held by a light source unit holder 24. In addition, lens holder 22 and light source unit holder 24 are fixedly connected to each other below optical axis Ax.

Projection lens 12 is configured by a plano-convex aspheric lens of which a front surface is a convex surface and a rear surface is a planar surface. However, projection lens 12 has a lens shape in which an upper area 12B is different from general areas 12A.

That is, an area of approximately ⅔ (two-thirds) of a lower end portion of projection lens 12 is configured as general area 12A in which a rear focus F is positioned on optical axis Ax and an area of approximately ⅓ (one-third) corresponding to an upper end portion thereof is configured as upper area 12B in which a rear focus Fb is positioned substantially just below rear focus F. The rear surfaces of general area 12A and upper area 12B are formed in a common plane, but the front surfaces thereof are formed in curves in which the shape of a front surface 12Aa of general area 12A is different from that of a front surface 12Ba of upper area 12B. Further, a boundary line L that extends horizontally is formed between the front surfaces 12Aa and 12Ba.

Projection lens 12 is adpated to project an image on a focal plane including rear focus F as an inversely projected image onto a virtual vertical screen in front of the lamp, in general area 12A. Further, projection lens 12 is also configured to project an image on a focal plane including rear focus Fb as the inversely projected image onto the virtual vertical screen, in upper area 12B. In this case, light from rear focus F is emitted to the front side as light which is parallel to optical axis Ax in general area 12A and is emitted to the front side as light which is slightly downward oriented relative to optical axis Ax in upper area 12B.

In FIG. 1, a curve shown as a two-dotted and dashed line in the vicinity of the surface of the front of projection lens 12 is a curve showing a cross-sectional shape when assuming that front surface 12Ba of upper area 12B is formed by a curved surface configured by extending front surface 12Aa of general area 12A.

Figure 3:
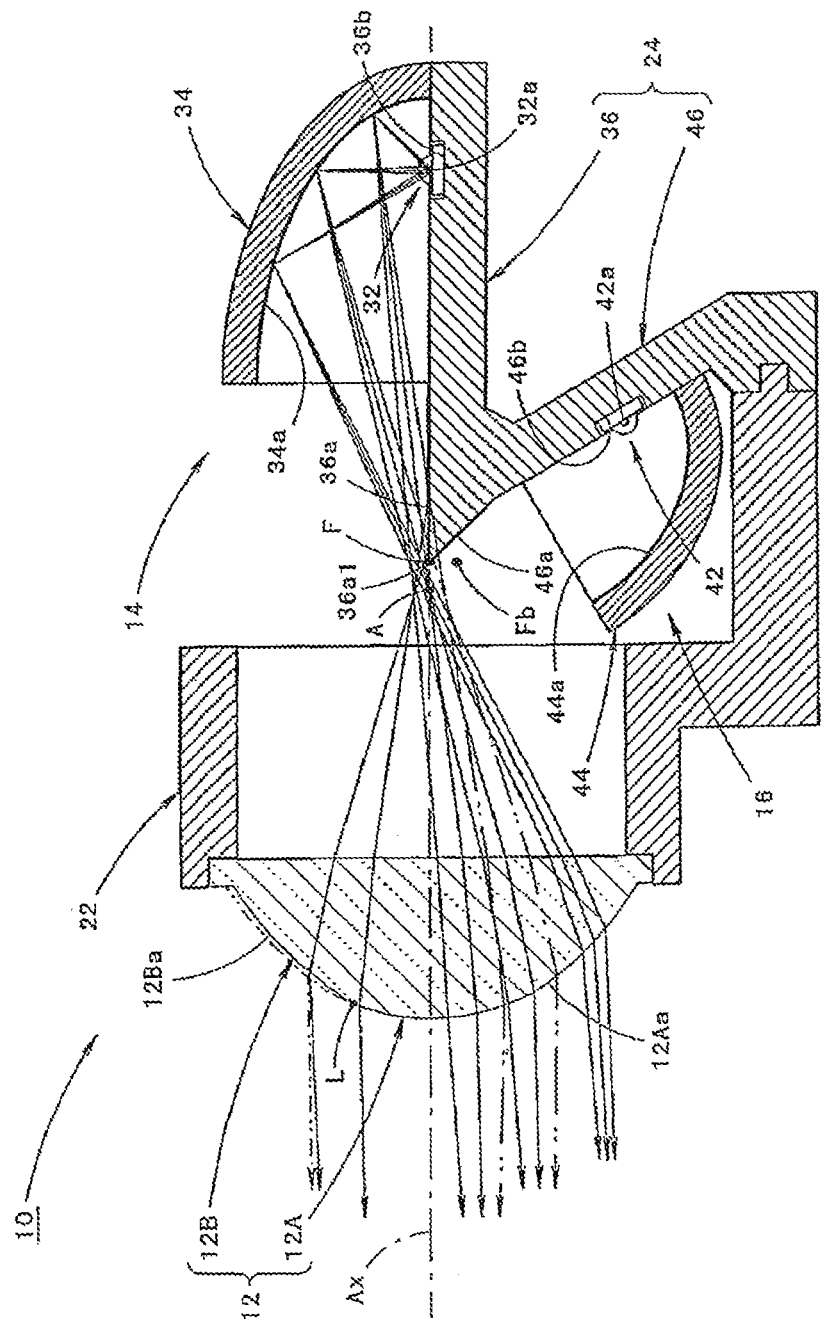

FIG. 3 is a side cross-sectional view illustrating vehicular lamp 10 by considering a light path when the first light source unit 14 is turned ON.

As shown in FIG. 3, first light source unit 14 includes a first light source 32 disposed on optical axis Ax at a position which lies further rearward than the rear focus F of general area 12A of projection lens 12, a first reflector 34 disposed to cover first light source 32 from above and adapted to reflect light from first light source 32 to optical axis Ax side toward projection lens 12, and a shade 36 disposed to allow a front end edge 36a1 to pass through rear focus F and adapted to shield some portion of the reflected light from first reflector 34.

In this case, shade 36 is configured as a mirror member having an upwardly oriented reflection surface 36a that extends rearward in parallel to optical axis Ax from front end edge 36a1. By this configuration, shade 36 is adapted to reflect the light that is reflected from first reflector 34, which is shield by shade 36, upwardly to be incident on projection lens 12.

Shade 36 is configured as a part of light source unit holder 24.

First light source 32 is a white light emitting diode that includes a light emitting chip 32a. Light emitting chip 32a is formed in a horizontally elongated rectangular shape and is fixedly positioned at a light source supporting recess portion 36b formed on a top surface that extends rearward from an upwardly oriented reflection surface 36a of shade 36 in a state that light emitting chip 32a is disposed to be vertically upward on optical axis Ax.

Reflection surface 34a of first reflector 34 is configured by a curved surface having a substantially ellipsoidal surface shape which has a longitudinal axis which is coaxial with optical axis Ax and takes a light-emitting center of first light source 32 as a first focus. In this case, reflection surface 34a is set such that a vertical cross-sectional shape along optical axis Ax is an ellipsoidal shape that takes a point A which is positioned further forward than rear focus F as a second focus, and is also set such that eccentricity thereof gradually increases toward a horizontal cross-section from a vertical cross-section. With this configuration, first reflector 34 is adapted to converge light from first light source 32 on point A within the vertical cross section and move a converging position significantly forward within the horizontal cross section. First reflector 34 is fixed to the upper surface of shade 36 on a lower end portion of a circumference of reflection surface 34a.

Upwardly oriented reflection surface 36a of shade 36 is formed by performing a mirror surface finishing processing with aluminum deposition on the upper surface of shade 36. In upwardly oriented reflection surface 36a, a left area that is positioned further leftward (the right side viewed from the front of the lamp) than optical axis Ax is configured by a horizontal plane including optical axis Ax, whereas a right area that is positioned further rightward than optical axis Ax is configured by a horizontal plane which is made lower by one step than the left area through a short slope. In addition, front end edge 36a1 of upwardly oriented reflection surface 36a is formed to extend along a focal plane including rear focus F. As a result, as shown in FIG. 3, shade 36 is configured such that some portion of the reflection light travelling toward projection lens 12 from reflection surface 34a of first reflector 34 is reflected upward on upwardly oriented reflection surface 36a and is incident on projection lens 12 to be emitted from projection lens 12 as downwardly oriented light.

In this case, projection lens 12 is configured such that boundary line L between general area 12A and upper area 12B is positioned to be spaced apart upwardly from optical axis Ax to some degree, first reflector 34 is disposed above the horizontal plane including optical axis Ax, and the light from first light source 32 is converged on point A within the vertical cross section. As a result, all of light reflected from first reflector 34 which is incident directly in projection lens 12 without causing the reflected light to be incident on upwardly oriented reflection surface 36a of shade 36 is incident on general area 12A. Further, most of the reflected light from first reflector 34 which is first reflected on upwardly oriented reflection surface 36a of shade 36 and then is incident on projection lens 12 is also incident on general area 12A, and only some portion of the light is incident on upper area 12B.

In this case, the light emitted from upper area 12B is emitted downward with respect to emission light (that is, emission light in the case of a general projection lens) shown by the two-dotted and dashed line in FIG. 3 by an angle corresponding to a downward displacement from rear focus F of rear focus Fb.

Figure 4:
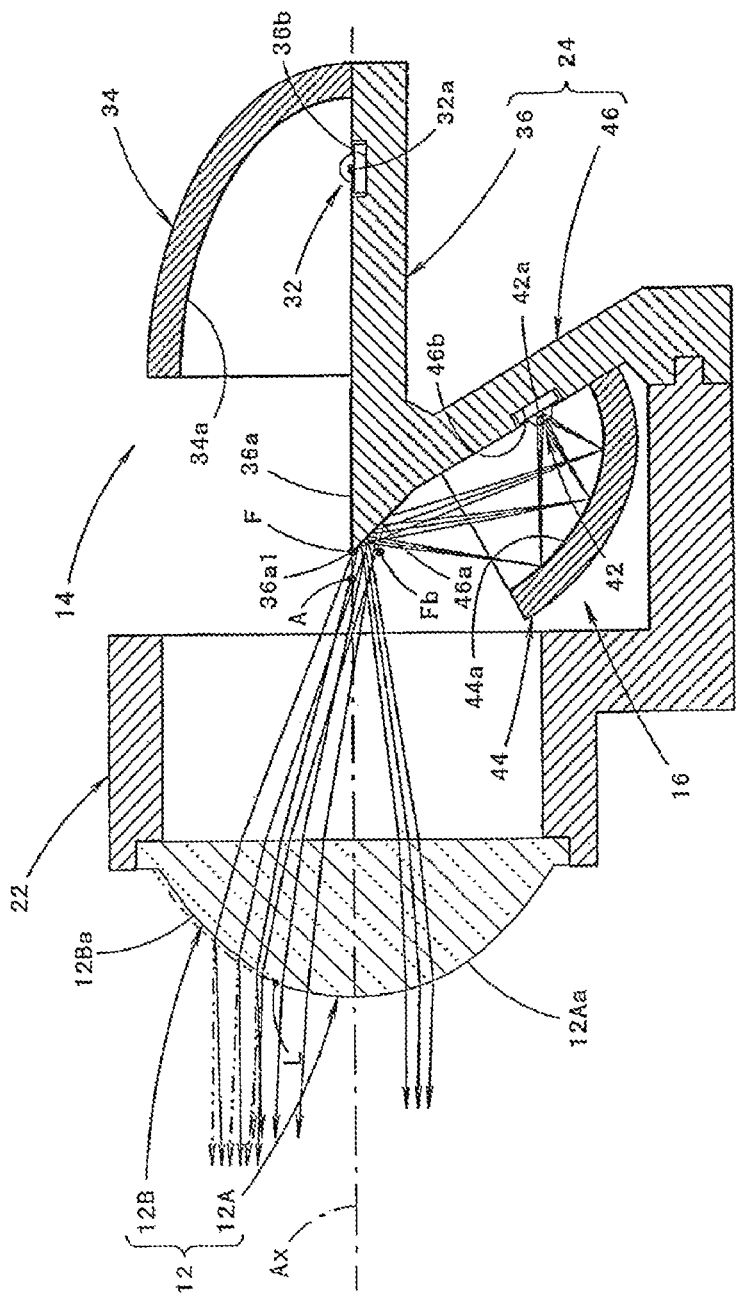

FIG. 4 is a side cross-sectional view showing vehicular lamp 10 by considering a light path when second light source unit 16 is turned ON.

As shown in FIG. 4, second light source unit 16 includes a second reflector 46 that has a downwardly oriented reflection surface 46a extending obliquely downward toward the rear of the lamp from the front end edge of upwardly oriented reflection surface 36a of shade 36, a second light source 42 disposed below of optical axis Ax, and a third reflector 44 having a reflection surface 44a that causes reflecting light from second light source 42 to be substantially converged on downwardly oriented reflection surface 46a. In this case, downwardly oriented reflection surface 46a of second reflector 46 is configured as the mirror member having a planar shape and second reflector 46 is configured as a part of light source unit holder 24.

The configuration of second light source 42 is similar to that of first light source 32, and a light emitting chip 42a thereof is disposed to be oriented obliquely downward as it goes forwardly in an obliquely downward-oriented rear of rear focus F. In addition, second light source 42 is fixedly positioned at a light source supporting concave portion 46b which is formed on a downward oriented slope face that extends obliquely downward in a rearward direction from a lower end edge of downwardly oriented reflection surface 46a of second reflector 46.

Reflection surface 44a of third reflector 44 is configured by a curved surface that has a substantially ellipsoidal surface shape which takes an light-emitting center of light source 42 as a first focus and eccentricity thereof is set to gradually increase toward left and right sides thereof from the vertical cross section. With this configuration, third reflector 44 is adapted to substantially converge the light from second light source 42 on a position positioned in the vicinity of the upper part of downwardly oriented reflection surface 46a in relation to a upward-downward direction, and alleviate a convergence degree in relation to a leftward-rightward direction. Third reflector 44 is fixed to the downward slope face of second reflector 46 on a rear end portion of a circumference of reflection surface 44a.

Downwardly oriented reflection surface 46a of second reflector 46 is configured by a plane which is inclined at an angle of about 45° with respect to the horizontal plane including optical axis Ax. As a result, as shown in FIG. 4, downwardly oriented reflection surface 46a of second reflector 46 reflects reflected light from reflection surface 44a of third reflector 44 forwardly to be incident on projection lens 12. Further, an attachment surface of third reflector 44 in second reflector 46 is formed in the plane shape at an inclination angle (for example, approximately 60°) larger than downwardly oriented reflection surface 46a.

In this case, most of the light from second light source 42 which is sequentially reflected on third reflector 44 and second reflector 46 is incident on general area 12A of projection lens 12, but the light is incident even on upper area 12B thereof to some degree.

In this case, the light emitted from upper area 12B is emitted downward with respect to emission light (that is, emission light in the case of the general projection lens) shown by the two-dotted and dashed line by an angle corresponding to the downward displacement from rear focus F of rear focus Fb.

Figure 5:
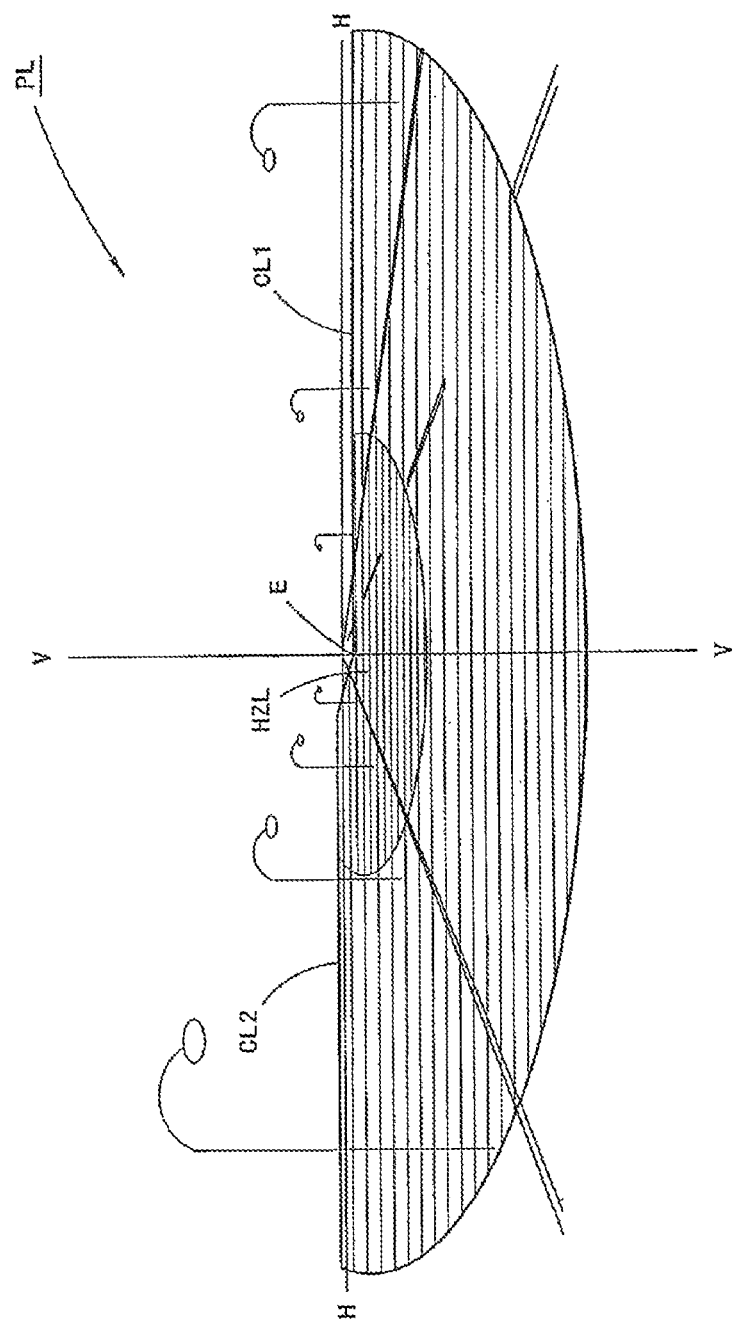
FIG. 5 is a perspective view of a low-beam light distribution pattern formed on a virtual vertical screen disposed at a position of 25 m ahead of a vehicle by light irradiated to the front from the vehicular lamp.
Figure 6:
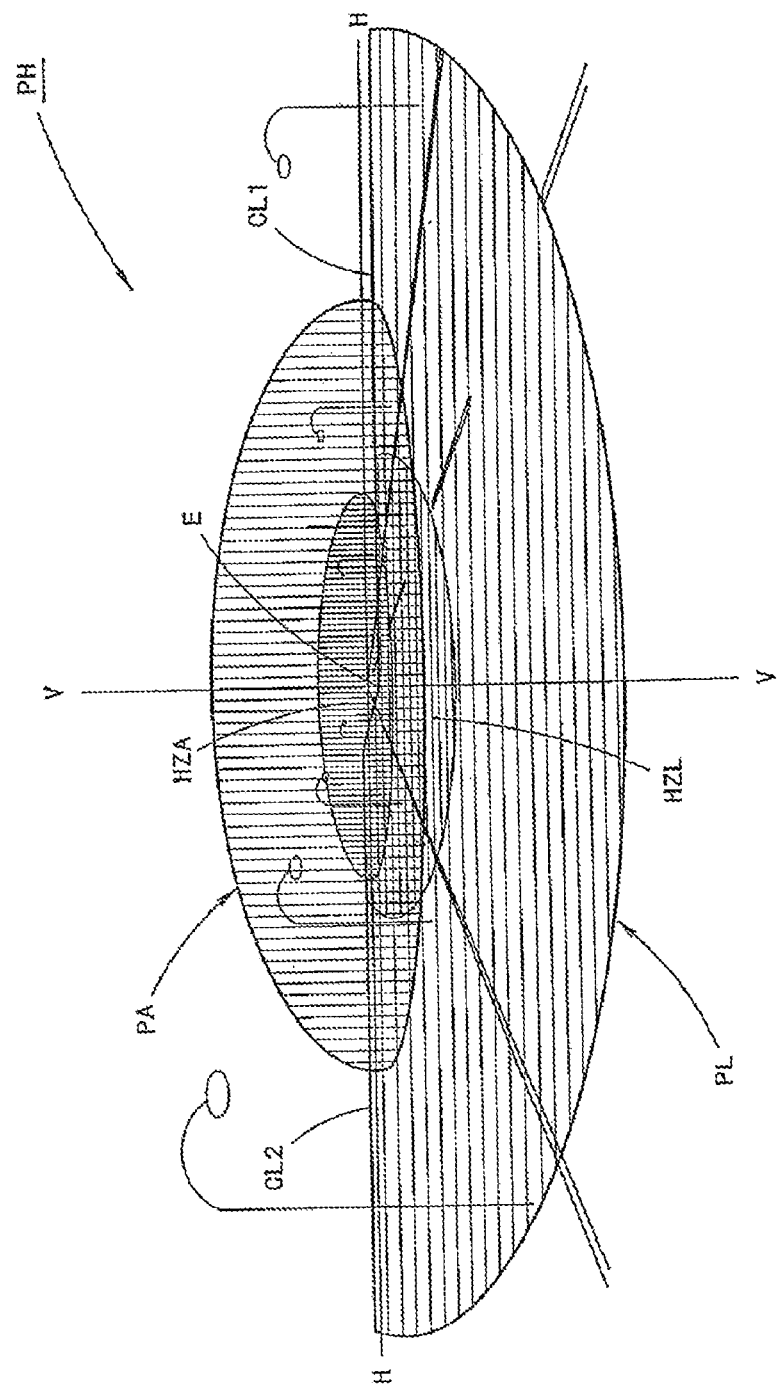
FIG. 6 is a perspective view of a high-beam light distribution pattern formed on the virtual vertical screen by the light that is irradiated to the front from the vehicular lamp.

FIGS. 5 and 6 are perspective views of a light distribution pattern formed on a virtual vertical screen disposed at a position of 25 m ahead of a vehicle by light irradiated to the front from vehicular lamp 10. FIGS. 5 and 6 illustrate a low-beam light distribution pattern (PL) and a high-beam light distribution pattern (PH), respectively.

Low-beam light distribution pattern PL shown in FIG. 5 is designed to be formed when first light source unit 14 is turned ON.

Low-beam light distribution pattern PL is a low-beam light distribution pattern for left-side light distribution that has cut-off lines CL1, CL2 having different left and right heights at an upper end edge thereof. Cut-off lines CL1, CL2 extend in a horizontal direction to have different left and right heights based on the V-V line, as a boundary, vertically passing through the H-V point which is a vanishing point lying in a forward direction of the lamp. A lane for oncoming vehicle lying further rightward than the V-V line is formed as lower cut-off line CL1 and a lane for self vehicle lying further leftward than the V-V line is formed as upper cut-off line CL2, which is raised in a step-by-step fashion from lower cut-off line CL1 to a higher level through a slope.

Low-beam light distribution pattern PL is formed by projecting an image of first light source 32 formed on the rear focal plane of projection lens 12 by the light from first light source 32, which is reflected on first reflector 34, as an inversely projected image onto the virtual vertical screen by projection lens 12, and cut-off lines CL1, CL2 thereof are formed as the inversely projected image of front end edge 36a1 of upwardly oriented reflection surface 36a of shade 36.

In low-beam light distribution pattern PL, an elbow point E that is a intersection point between lower cut-off line CL1 and the V-V line is positioned below the H-V point by an angle of 0.5° to 0.6°. This is because optical axis Ax extends in a downward direction with respect to forward-rearward direction of the vehicle by an angle of 0.5° to 0.6°. In addition, a hot zone HZL which is a high-luminosity area is formed to surround elbow point E in low-beam light distribution pattern PL.

High-beam light distribution pattern PH shown in FIG. 6 is formed when first and second light source units 14 and 16 are turned ON simultaneously.

High-beam light distribution pattern PH is formed as a composite light distribution pattern of low-beam light distribution pattern PL and additional light distribution pattern PA that is expanded upwardly from cut-off lines CL1, CL2 of low-beam light distribution pattern PL.

Additional light distribution pattern PA is formed as a light distribution pattern which is brighter and smaller than low-beam light distribution pattern PL, and a lower end edge thereof is formed as a light distribution pattern which is expanded further downward than cut-off lines CL1, CL2. In addition, a hot zone HZA is formed with being substantially centered at the H-V point in additional light distribution pattern PA.

In this case, additional light distribution pattern PA is formed as the light distribution pattern which is brighter and smaller than low-beam light distribution pattern PL. This is because the light from second light source 42, which is reflected on third reflector 44, is reflected forward on downwardly oriented reflection surface 46a of second reflector 46 approximately in the vicinity of rear focus F to pass through the rear focal plane of projection lens 12 in the vicinity of rear focus F.

Further, even though downwardly oriented reflection surface 46a of second reflector 46 extends obliquely downward toward the rearward of the lamp from front end edge 36a1 of upwardly oriented reflection surface 36a of shade 36, the lower edge of additional light distribution pattern PA is formed as a light distribution pattern that is expanded further downward than cut-off lines CL1, CL2. This is because light incident on projection lens 12 that forms a lower area of additional light distribution pattern PA as upwardly oriented light among the reflected light from downwardly oriented reflection surface 46a of second reflector 46 is incident on upper area 12B of projection lens 12 to be emitted downward from upper area 12B relative to the light emitted by the general projection lens.

As a result, high-beam light distribution pattern PH is formed as a light distribution pattern where additional light distribution pattern PA is partially overlapped with low-beam light distribution pattern PL in the vicinity of cut-off lines CL1, CL2 thereof. In this case, a hot zone of high-beam light distribution pattern PH is formed of hot zone HZL for low-beam light distribution pattern PL and hot zone HZA for additional light distribution pattern PA.

As described above, vehicular lamp 10 according to the exemplary embodiment is configured by placing first light source unit 14 that is turned ON to form low-beam light distribution pattern PL and second light source unit 16 that is additionally turned ON to form high-beam light distribution pattern PH, in the rear of projection lens 12. However, since upper area 12B of projection lens 12 is configured to emit the light from rear focus F further downward than the emitted light from general area 12A, the following operational effects can be acquired.

That is, first light source unit 14 is configured such that the light from first light source 32 disposed at a position which lies further rearward than rear focus F is reflected toward projection lens 12 by first reflector 34 disposed to cover first light source 32 from above. And some portion of the reflected light from first reflector 34 is shielded by shade 36 disposed to allow front end edge 36a1 to pass through rear focus F. As a result, low-beam light distribution pattern PL having cut-off lines CL1 and CL2 on the upper end portion thereof is formed by turning ON first light source unit 14. In this case, since most of the reflected light from the first reflector incident on projection lens 12 is incident on general area 12A of projection lens 12, low-beam light distribution pattern PL is formed to have substantially the same as in the related art.

In the meantime, second light source unit 16 is configured such that the light from second light source 42 disposed at a position which lies further downward than rear focus F is reflected toward projection lens 12 by second reflector 46 disposed to extend obliquely downward in the rearward direction from front end edge 36a1 of shade 36. As a result, additional light distribution pattern PA is formed in the upper side of cut-off lines CL1, CL2 of low-beam light distribution pattern PL by turning ON second light source unit 16. In this case, a lower area of additional light distribution pattern PA is formed by the some portion of light incident on upper area 12B of projection lens 12 among the reflected light from second reflector 46. However, since the light incident on upper area 12B of projection lens 12 is emitted further downward than general projection lens 12, and as a result, additional light distribution pattern PA is formed as a light distribution pattern that is expanded further downward than cut-off lines CL1, CL2 of low-beam light distribution pattern PL.

Therefore, high-beam light distribution pattern PH becomes a light distribution pattern in which low-beam light distribution pattern PL and additional light distribution pattern PA are overlapped with each other in the vicinity of cut-off lines CL1, CL2 in low-beam light distribution pattern PL, so that brightness of a boundary portion therebetween can be sufficiently ensured.

According to the exemplary embodiment, in vehicular lamp 10 in which first and second light source units 14 and 16 are disposed in the rear of projection lens 12, the brightness of the boundary portion between low-beam light distribution pattern PL and additional light distribution pattern PA in high-beam light distribution pattern PH can be sufficiently ensured. As a result, distant visibility in a high beam can be improved. This can be implemented within a range of a projector type lamp configuration.

In the exemplary embodiment, since shade 36 is configured to have upwardly oriented reflection surface 36a that extends rearward from front end edge 36a1 thereof, and further, a boundary line L between upper area 12B and general area 12A in projection lens 12 is positioned at a position which lies further upward than rear focus F, the following operational effects can be obtained.

That is, since shade 36 has upwardly oriented reflection surface 36a that extends rearward from front end edge 36a1 thereof, the reflected light from first reflector 34 which should be shielded by shade 36 can be reflected upward on upwardly oriented reflection surface 36a to be incident on projection lens 12. Accordingly, by effectively using the light from first light source 32 can be effectively used, so that brightness in an area in the vicinity of cut-off lines CL1, CL2 in low-beam light distribution pattern PL can be increased.

However, in such a configuration, the reflected light from first reflector 34, which is reflected on upwardly oriented reflection surface 36a, is incident on projection lens 12 at a position which lies further upward than rear focus F. However, since boundary line L is positioned at a position which lies further upward than rear focus F, an amount of the reflected light from first reflector 34, which is reflected on upwardly oriented reflection surface 36a, to be incident on upper area 12B of projection lens 12 can be suppressed to be minimal Accordingly, the light reflected from first reflector 34 that is reflected on upwardly oriented reflection surface 36a and emitted from projection lens 12 can be kept in a state that the reflected light is utilized to increase brightness in the area in the vicinity of cut-off lines CL1, CL2 in low-beam light distribution pattern PL.

In the exemplary embodiment, since upper area 12B of projection lens 12 is configured to have rear focus Fb at a position which lies further downward than rear focus F, the shape of the lens can be easily designed.

Further, in the exemplary embodiment, since second light source unit 16 is configured to have third reflector 44 that reflects the light from second light source 42 toward second reflector 46, the degree of freedom of arrangement for second light source 42 can be improved. Furthermore, the reflected light from second reflector 46 may be efficiently incident on upper area 12B of projection lens 12.

In the exemplary embodiment, upper area 12B of projection lens 12 has rear focus Fb at a position which lies further downward than rear focus F. However, when it is configured such that the light from rear focus F is emitted forward as light which is oriented slightly downward with respect to optical axis Ax, upper area 12B may be formed by a free curved surface. By adopting the configuration, a step or a ridge can be prevented from being formed on a boundary line L between front surface 12Aa of general area 12A and front surface 12Ba of upper area 12B.

In the exemplary embodiment, shade 36 is configured as the mirror member having upwardly oriented reflection surface 36a that extends rearward from front end edge 36a1 thereof in parallel to optical axis Ax. However, shade 36 can be configured such that a part corresponding to upwardly oriented reflection surface 36a may not have a light reflection function or the part corresponding to upwardly oriented reflection surface 36a itself may not be provided. When the configuration is adopted, the reflected light from first reflector 34 which should be shielded by shade 36 is not reflected on upwardly oriented reflection surface 36a upwardly to be incident on projection lens 12 so that all of the light reflected from first reflector 34 may be incident on general area 12A of projection lens 12. Furthermore, in such a configuration, although the position of boundary line L is made to be lowered to the vicinity of optical axis Ax, all of the light reflected from first reflector 34 may be incident on general area 12A of projection lens 12.

In the exemplary embodiment, shade 36 is configured to allow front end edge 36a1 thereof to be disposed to pass through rear focus F. However, front end edge 36a1 thereof may be disposed to pass through a position which is slightly deviated from rear focus F. In this case, cut-off lines CL1, CL2 of low-beam light distribution pattern PL becomes somewhat indistinct, but the substantially same operational effect as the case of the exemplary embodiment can be obtained.

In the exemplary embodiment, second reflector 46 of second light source unit 16 is disposed to extend obliquely downward in rearward direction from front end edge 36a1 of shade 36, but second reflector 46 may be disposed to extend obliquely downward as it goes rearwardly from the position which is slightly deviated from front end edge 36a1 of shade 36. Even in this case, the light reflected from second reflector 36 and incident on upper area 12B of projection lens 12 is emitted further downward than general projection lens 12, such that additional light distribution pattern PA is formed as the light distribution pattern that is expanded further downward than cut-off lines CL1 and CL2 of low-beam light distribution pattern PL, so that substantially the same operational effect as the case of the exemplary embodiment can be acquired.

In the exemplary embodiment, second reflector 46 of second light source unit 16 is configured as the mirror member of which downwardly oriented reflection surface 46a has the planar shape. However, downwardly oriented reflection surface 46a may be formed in the curved surface. Further, the light from second light source 42 can be made to be incident directly on downwardly oriented reflection surface 46a.

In the exemplary embodiment, vehicular lamp 10 has a configuration in which low-beam light distribution pattern PL forms a low-beam light distribution pattern of left light distribution, but even in a case where low-beam light distribution pattern PL forms a low-beam light distribution pattern of right light distribution, the same operational effect can be obtained by adopting the same configuration as the exemplary embodiment.

Numerical values expressed as data are just one example in the exemplary embodiment and may be appropriately set to different values.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicular lamp, comprising:
a projection lens;
a first light source unit disposed behind the projection lens, and including a first light source disposed at a position behind a rear focus of the projection lens, a first reflector disposed to cover the first light source from above and adapted to reflect light from the first light source toward the projection lens, and a shade disposed to allow a front end edge to pass through the rear focus or the vicinity thereof and adapted to shield a portion of the reflected light by the first reflector; and
a second light source unit disposed behind the projection lens, and including a second light source disposed under the rear focus and a third reflector adapted to reflect light from the second light source toward the projection lens via a second reflector the second reflector being disposed to extend downward from the front end edge of the shade or the vicinity thereof and adapted to reflect the reflected light from the third reflector toward the projection lens,
wherein a low-beam light distribution pattern is formed by turning ON the first light source unit and a high-beam light distribution pattern is formed by additionally turning ON the second light source unit, and
the projection lens includes an upper area having a rear focus thereof different form the rear focus of the projection lens and positioned below the rear focus of the projection lens, such that the light from the rear focus of the upper area is emitted further downward than emission light from a general area of the projection lens other than the upper area.

2. The vehicular lamp of claim 1, wherein the shade includes an upwardly oriented reflection surface that extends rearward from the front end edge of the shade, and a boundary line between the upper area and the general area in the projection lens and along a front surface of the projection lens is positioned above the rear focus of the projection lens.

* * * * *